(12) United States Patent
Moses et al.

(10) Patent No.: US 9,800,568 B1
(45) Date of Patent: Oct. 24, 2017

(54) METHODS FOR CLIENT CERTIFICATE DELEGATION AND DEVICES THEREOF

(71) Applicant: F5 Networks, Inc., Seattle, WA (US)

(72) Inventors: Joel Moses, Seattle, WA (US); Kevin Stewart, Seattle, WA (US); William Church, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 15/199,807

(22) Filed: Jun. 30, 2016

Related U.S. Application Data

(60) Provisional application No. 62/309,044, filed on Mar. 16, 2016.

(51) Int. Cl.
*H04L 29/06* (2006.01)

(52) U.S. Cl.
CPC ...... *H04L 63/0823* (2013.01); *H04L 63/0884* (2013.01)

(58) Field of Classification Search
CPC .................. H04L 63/0823; H04L 63/0884
USPC .......................................................... 726/10
See application file for complete search history.

(56) References Cited

U.S. PATENT DOCUMENTS 5,659,616 A * 8/1997 Sudia .................. G06Q 20/341
380/30
6,367,009 B1 * 4/2002 Davis .................. H04L 63/0442
713/152
8,452,956 B1   5/2013 Kersey et al.
2012/0204025 A1   8/2012 Lau
2014/0095865 A1   4/2014 Yerra et al.
2015/0215308 A1   7/2015 Manolov et al.
2015/0281217 A1 * 10/2015 Petrov ................. H04L 63/0823
726/10

FOREIGN PATENT DOCUMENTS

WO       0215523 A1    2/2002

OTHER PUBLICATIONS

Wallance, "Delegating Identity Using X.509 Certificates", Jul. 29, 2015, 8 pgs, IETF Trust.
Extended European Search Report for corresponding European Patent Application 17161343.3, dated May 19, 2017, 9 pgs.

* cited by examiner

*Primary Examiner* — Matthew Henning
(74) *Attorney, Agent, or Firm* — LeClairRyan, A Professional Corporation

(57) ABSTRACT

Methods, non-transitory computer readable media, and network traffic management apparatuses that receive a request from a client device to access an application. The request comprises an original certificate. A determination is made when the certificate is valid. Data is extracted from one or more fields of the certificate, when the determining indicates that the user certificate is valid. A delegate certificate comprising the data and signed by a certificate authority trusted by a server device hosting the application is generated. The delegate certificate is sent to the server device. With this technology, network traffic management apparatuses can secure SSL connections using PFS-capable ciphers, while also inspecting payload data in network traffic exchanged between client and server devices in order to provide intelligent services in the network.

24 Claims, 6 Drawing Sheets

METHODS FOR CLIENT CERTIFICATE DELEGATION AND DEVICES THEREOF

This application claims the benefit of U.S. Provisional Patent Application Ser. No. 62/309,044, filed on Mar. 16, 2016, which is hereby incorporated by reference in its entirety.

FIELD

This technology relates to network security, and more particularly to methods and devices for client certificate delegation.

BACKGROUND

Secure Sockets Layer (SSL)/Transport Layer Security (TLS) protocols prevent client devices from presenting certificates to server devices if an intermediary proxy device, such as a network traffic management apparatus, is offloading and optionally re-encrypting SSL communications between both devices. The client device must sign its certificate response to the network traffic management apparatus with its private key, and since the network traffic management apparatus does not have a copy of the client device's private key, it cannot re-sign the certificate to present it to the server device.

However, network traffic management apparatuses can tunnel the client-server SSL communications. Using a tunnel, the client device and server device can establish a true end-to-end SSL session and the client device can pass its certificate. However, such tunneling does not allow the network traffic management apparatus to analyze data (e.g., connection/session data) above OSI layer 4, or to use any such data to provide proxy functions (e.g., security services or load balancing). Accordingly, with tunneling, much of the intelligence of network traffic management apparatuses cannot be utilized.

Network traffic management apparatuses can also perform an SSL man-in-the-middle function, commonly referred to as ProxySSL. ProxySSL allows a client device and a server device to establish an end-to-end SSL session, but also allows a network traffic management apparatus to derive the same session encryption key to be able to transparently decrypt and inspect higher level payload data. However, ProxySSL does not support all cipher suites that a client device and server device may use and, accordingly, is of limited utility. More specifically, network devices are increasingly only supporting relatively secure ephemeral ciphers that will not allow network traffic management apparatuses to take advantage of ProxySSL.

In one particular example, network traffic management apparatuses are not able to utilize ProxySSL techniques to analyze payloads associated with communications encrypted using Perfect Forward Secrecy (PFS) encryption, which utilizes such ephemeral keys and is increasingly used in communication networks. Accordingly, network traffic management apparatuses cannot effectively provide services that require higher level payload data for SSL connections between client and server devices in many communication networks.

SUMMARY

A method for client certificate delegation includes receiving, by a network traffic management apparatus, a request from a client device to access an application, the request comprising an original certificate. A determination is made, by the network traffic management apparatus, when the certificate is valid. Data is extracted, by the network traffic management apparatus, from one or more fields of the certificate, when the determining indicates that the user certificate is valid. A delegate certificate is generated by the network traffic management apparatus. The delegate certificate includes the data and is signed by a certificate authority trusted by a server device hosting the application. The delegate certificate is sent, by the network traffic management apparatus, to the server device.

A network traffic management apparatus includes memory including programmed instructions stored in the memory and one or more processors configured to be capable of executing the programmed instructions stored in the memory to receive a request from a client device to access an application, the request comprising an original certificate. A determination is made when the certificate is valid. Data is extracted from one or more fields of the certificate, when the determining indicates that the user certificate is valid. A delegate certificate is then generated. The delegate certificate includes the data and is signed by a certificate authority trusted by a server device hosting the application. The delegate certificate is sent to the server device.

A non-transitory computer readable medium having stored thereon instructions for client certificate delegation includes executable code which when executed by one or more processors, causes the one or more processors to perform steps comprising receiving a request from a client device to access an application, the request comprising an original certificate. A determination is made when the certificate is valid. Data is extracted from one or more fields of the certificate, when the determining indicates that the user certificate is valid. A delegate certificate is then generated. The delegate certificate includes the data and is signed by a certificate authority trusted by a server device hosting the application. The delegate certificate is sent to the server device.

This technology has a number of associated advantages including providing methods, non-transitory computer readable media, and network traffic management apparatuses that facilitate more effective network security. With this technology, network traffic management apparatuses can secure SSL connections between both client devices and server devices, between which it is proxying network traffic, using PFS-capable ciphers, while also having the ability to inspect payload data of the network traffic in order to provide intelligent services in the network.

DETAILED DESCRIPTION

Figure 1:
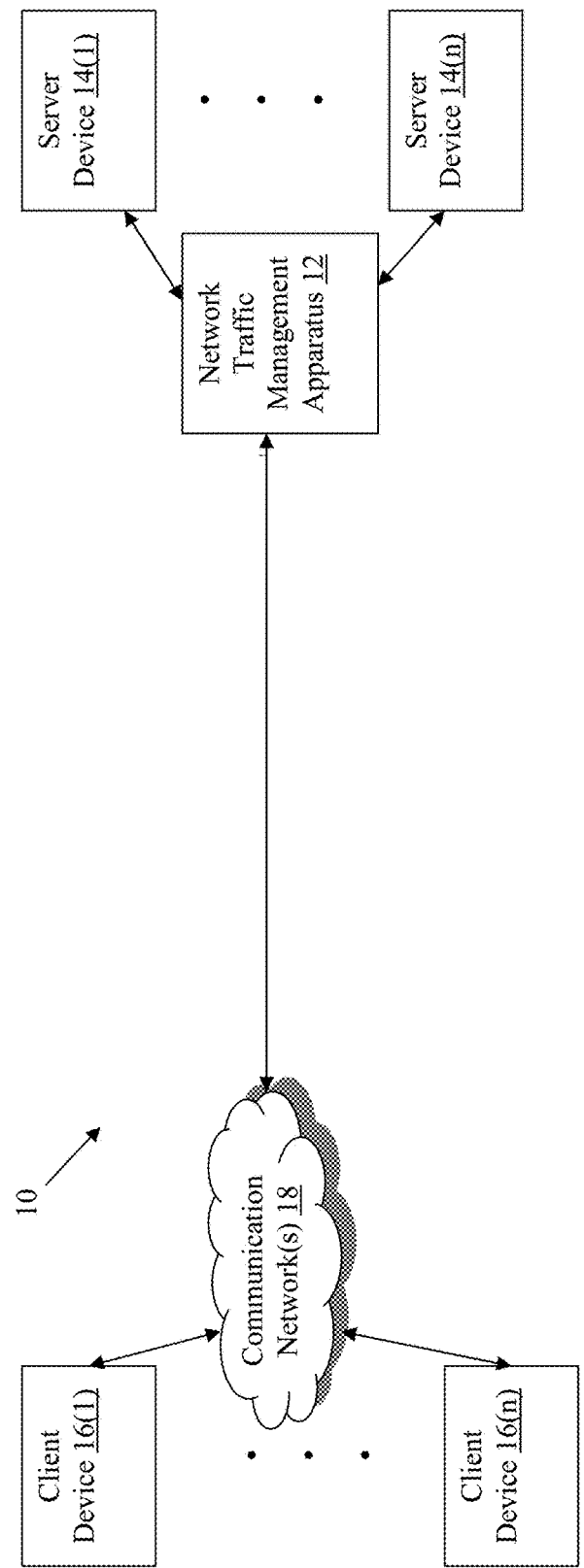
FIG. 1 is a system diagram of a network environment with an exemplary network traffic management apparatus.

Referring to FIG. 1, a system diagram is shown including an exemplary network environment 10 which incorporates an exemplary network traffic management apparatus 12. The network traffic management apparatus 12 is coupled to a plurality of server devices 14(1)-14(n) and a plurality of client devices 16(1)-16(n) via communication network(s) 18, although the network traffic management apparatus 12, server devices 14(1)-14(n), and client devices 16(1)-16(n) may be coupled together via other topologies. Additionally, the network environment 10 may include other network devices such as one or more routers and/or switches, for example, which are well known in the art and thus will not be described herein. This technology provides a number of advantages including methods, non-transitory computer readable media, and network traffic management apparatuses that facilitate client certificate delegation to allow access to payload data between client and server devices, which is used to provide intelligent services.

Figure 2:
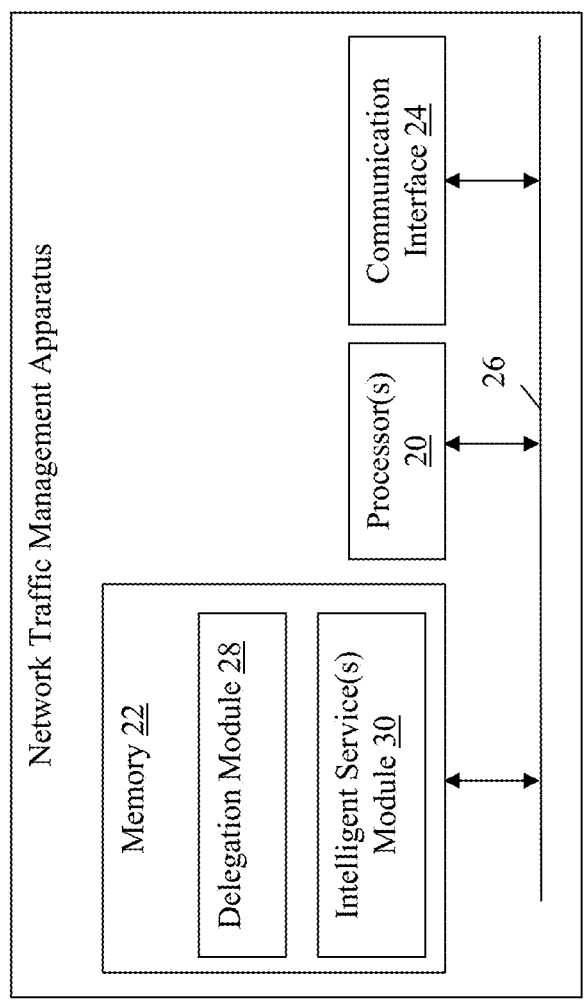
FIG. 2 is a block diagram of the exemplary network traffic management apparatus shown in FIG. 1.

Referring to FIGS. 1-2, the network traffic management apparatus 12 may perform any number of functions including managing network traffic, load balancing network traffic across the server devices 14(1)-14(n), accelerating network traffic associated with web applications hosted by the server devices 14(1)-14(n), or providing security or firewall services, for example. The network traffic management apparatus 12 includes one or more processors 20, a memory 22, and a communication interface 24, which are coupled together by a bus 26 or other communication link, although the network traffic management apparatus 12 can include other types and numbers of elements in other configurations.

The processor(s) 20 of the network traffic management apparatus 12 may execute programmed instructions stored in the memory of the network traffic management apparatus 12 for the any number of the functions identified above. The processor(s) 20 of the network traffic management apparatus 12 may include one or more CPUs or general purpose processors with one or more processing cores, for example, although other types of processor(s) can also be used.

The memory 22 of the network traffic management apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 20, can be used for the memory 22.

Accordingly, the memory 22 of the network traffic management apparatus 12 can store one or more applications that can include computer executable instructions that, when executed by the network traffic management apparatus 12, cause the network traffic management apparatus 12 to perform actions, such as to transmit, receive, or otherwise process messages, for example, and to perform other actions described and illustrated below with reference to FIGS. 3-6. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the network traffic management apparatus 12 itself, may be located in virtual server(s) running in a cloud-based computing environment rather than being tied to one or more specific physical network computing devices. Also, the application(s) may be running in one or more virtual machines (VMs) executing on the network traffic management apparatus 12. Additionally, in one or more embodiments of this technology, virtual machine(s) running on the network traffic management apparatus 12 may be managed or supervised by a hypervisor.

In this particular example, the memory 22 of the network traffic management apparatus 12 includes a delegation module 28 and an intelligent service(s) module 30, although the memory 22 can include other policies, modules, databases, or applications, for example. The delegation module 28 in this example is configured to process received client certificates to generate synthetic delegate certificates that can be used to establish a server-side SSL connection, as described and illustrated in more detail later. By utilizing the delegate certificates, the network traffic management apparatus 12 is able to access payload data at a relatively high level (e.g., above OSI layer 4). While the connection is described and illustrated herein as being an SSL connection, the connection could also be a Transport Layer Security (TLS) connection or any SSL-derived transport encryption type of connection.

The intelligent service(s) module 30 in this example is configured to process the accessed payload data to provide an intelligent service for the associated network traffic. Accordingly, the intelligent server(s) module 30 can implement one or more intelligent services, such as load balancing network traffic across the server devices 14(1)-14(n), accelerating network traffic associated with web applications hosted by the server devices 14(1)-14(n), or providing security or firewall services, for example, that require access to relatively high level payload data.

The communication interface 24 of the network traffic management apparatus 12 operatively couples and communicates between the network traffic management apparatus 12, the server devices 14(1)-14(n), and the client devices 16(1)-16(n), which are all coupled together by the communication network(s) 18, although other types and numbers of communication networks or systems with other types and numbers of connections and configurations to other devices and elements can also be used.

By way of example only, the communication network(s) 18 can include local area network(s) (LAN(s)) or wide area network(s) (WAN(s)), and can use TCP/IP over Ethernet and industry-standard protocols, although other types and numbers of protocols and/or communication networks can be used. The communication network(s) 18 in this example can employ any suitable interface mechanisms and network communication technologies including, for example, tele-traffic in any suitable form (e.g., voice, modem, and the like), Public Switched Telephone Network (PSTNs), Ethernet-based Packet Data Networks (PDNs), combinations thereof, and the like. The communication network(s) 18 can also include direct connection(s) (e.g., for when the device illustrated in FIG. 1, such as the network traffic management apparatus 12, client devices 16(1)-16(n), or server devices 14(1)-14(n) operate as virtual instances on the same physical machine).

While the network traffic management apparatus 12 is illustrated in this example as including a single device, the network traffic management apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network traffic management apparatus 12.

Additionally, one or more of the devices that together comprise the network traffic management apparatus 12 in other examples can be standalone devices or integrated with one or more other devices or apparatuses, such as one of the server devices 14(1)-14(n), for example. Moreover, one or more of the devices of the network traffic management apparatus 12 in these examples can be in a same or a different communication network including one or more public, private, or cloud networks, for example.

Each of the server devices 14(1)-14(n) in this example includes one or more processors, a memory, and a communication interface, which are coupled together by a bus or other communication link, although other numbers and types of network devices could be used. The server devices 14(1)-14(n) in this example process requests received from the client devices 16(1)-16(n) related to hosted applications via the communication network(s) 18 according to the HTTP-based application RFC protocol, for example. Various applications may be operating on the server devices 14(1)-14(n) and transmitting data (e.g., files or Web pages) to the client devices 16(1)-16(n) via the network traffic management apparatus 12 in response to requests from the client devices 16(1)-16(n). The server devices 14(1)-14(n) may be hardware or software or may represent a system with multiple servers in a pool, which may include internal or external networks.

Although the server devices 14(1)-14(n) are illustrated as single devices, one or more actions of each of the server devices 14(1)-14(n) may be distributed across one or more distinct network computing devices that together comprise one or more of the server devices 14(1)-14(n). Moreover, the server devices 14(1)-14(n) are not limited to a particular configuration. Thus, the server devices 14(1)-14(n) may contain a plurality of network computing devices that operate using a master/slave approach, whereby one of the network computing devices of the server devices 14(1)-14(n) operate to manage and/or otherwise coordinate operations of the other network computing devices. The server devices 14(1)-14(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices 14(1)-14(n) can operate within the network traffic management apparatus itself rather than as a standalone device communicating with the network traffic management apparatus 12 via the communication network(s) 18. In this example, the one or more server devices 14(1)-14(n) operate within the memory 22 of the network traffic management apparatus 12.

The client devices 16(1)-16(n) in this example include any type of computing device that can request access to applications hosted by the server devices 14(1)-14(n) and establish SSL sessions, such as mobile computing devices, desktop computing devices, laptop computing devices, tablet computing devices, virtual machines (including cloud-based computers), or the like. Each of the client devices 16(1)-16(n) in this example includes a processor, a memory, and a communication interface, which are coupled together by a bus or other communication link, although other numbers and types of network devices could be used.

The client devices 16(1)-16(n) may run interface applications, such as standard web browsers or standalone client applications, which may provide an interface to make requests for, and receive content stored on, one or more of the server devices via the communication network(s) 18. The client devices 16(1)-16(n) may further include a display device, such as a display screen or touchscreen, and/or an input device, such as a keyboard for example.

Although the exemplary network environment with the network traffic management apparatus 12, server devices 14(1)-14(n), client devices 16(1)-16(n), and communication network(s) 18 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 10, such as the network traffic management apparatus 12, client devices 16(1)-16(n), or server devices 14(1)-14(n), for example, may be configured to operate as virtual instances on the same physical machine. In other words, one or more of the network traffic management apparatus 12, client devices 16(1)-16(n), or server devices 14(1)-14(n) may operate on the same physical device rather than as separate devices communicating through communication network(s). Additionally, there may be more or fewer network traffic management apparatuses 12, client devices 16(1)-16(n), or server devices 14(1)-14(n) than illustrated in FIG. 1. The client devices 16(1)-16(n) could also be implemented as applications on the network traffic management apparatus 12 itself as a further example.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 3:
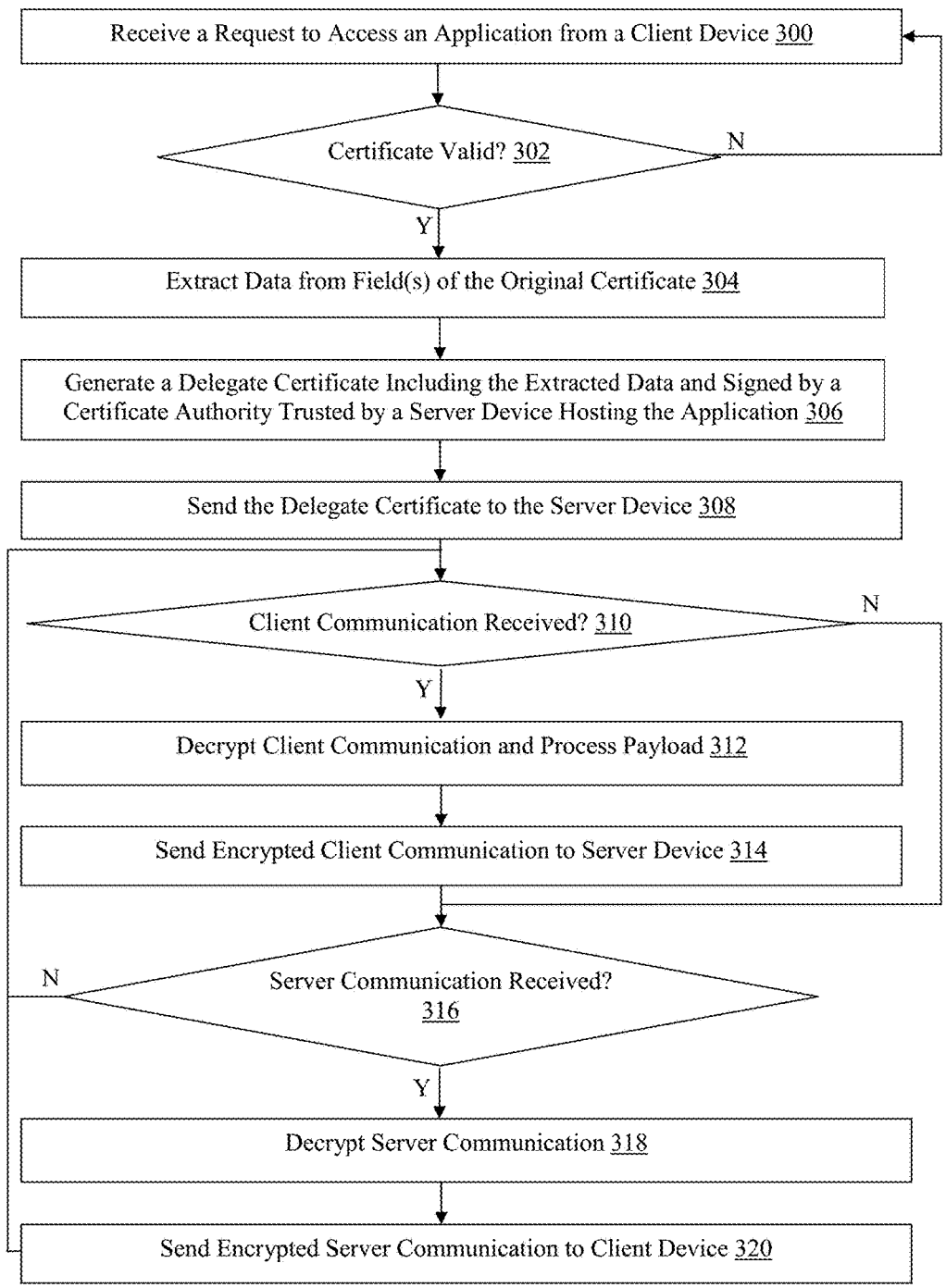
FIG. 3 is a flowchart of an exemplary method for facilitating client certificate delegation.

An exemplary method of utilizing a delegated version of a client certificate presented by one of the client devices 16(1)-16(n) for authentication to an application hosted by one of the server devices 14(1)-14(n) will now be described with reference to FIGS. 1-6. Referring more specifically to FIG. 3, in step 300, the network traffic management apparatus 12 receives, from one of the client devices 16(1)-16(n), a request to establish an SSL session in order to access an application hosted by one of the server devices 14(1)-14(n).

The request can be received based on an attempt to log into the application sent via a web browser on the one of the client devices 16(1)-16(n), for example. In response, the network traffic management apparatus 12 can request a certificate from the one of the client devices 16(1)-16(n). The network traffic management apparatus 12 can then receive an original SSL digital certificate from the one of the client devices 16(1)-16(n), such as via a Common Access Card (CAC) for example, although any other method of obtaining an original certificate from the one of the client devices 16(1)-16(n) can also be used.

In step 302, the network traffic management apparatus 12 determines whether the original certificate is valid or authenticated. Accordingly, the network traffic management apparatus 12 can verify the signature on the certificate with the public key of a trusted signing authority or issuer for the certificate, check a certificate revocation list (CRL) to determine whether the certificate has been blacklisted, and/or analyze other information included in the certificate to determine whether the user of the one of the client devices 16(1)-16(n) is a valid user for the application, for example, although other steps can also be taken in order to validate the certificate.

If the network traffic management apparatus 12 determines that the original certificate is not valid, then the No branch is taken and the network traffic management apparatus 12 may receive another request to access an application from the one of the client devices 16(1)-16(n) or another one of the client devices 16(1)-16(n). Optionally, the network traffic management apparatus 12 can send an error message to the one of the client devices 16(1)-16(n) indicating that it was not able to validate the presented original certificate.

However, if the network traffic management apparatus 12 determines in step 302 that the original certificate is valid, then the Yes branch is taken to step 304. In step 304, the network traffic management apparatus 12 extracts data from one or more fields of the original certificate received in step 300. The data is extracted from at least one or more required attributes or fields of the original certificate.

In step 306, the network traffic management apparatus 12 generates a delegate certificate that includes the data extracted in step 304. Optionally, the delegate certificate is stamped or annotated to include an indication of the application. For example, the network traffic management apparatus 12 can insert the indication of the application into a Service Principle Name (SPN) SSL extension of the delegate certificate in order to annotate the delegate certificate, although other methods of annotating the delegate certificate can be used.

Also optionally, the delegate certificate can be generated by the network traffic management apparatus 12 to have an established lifetime, which is relatively short or limited (e.g., one day). Accordingly, the delegate certificate in this example is meant for limited-time use authentication to the application. By limiting the lifetime of the delegate certificate, a CRL mechanism for revoking the certificate is not required.

In this example, the delegate certificate generated by the network traffic management apparatus 12 is signed by a certificate authority that is trusted by the one of the server devices 14(1)-14(n) hosting the application for which the one of the client devices 16(1)-16(n) requested access in step 300. The certificate authority is a trusted issuer certificate authority that signed the original certificate or a local delegate certificate authority having a trust relationship with the trusted issuer certificate authority.

Figure 4:
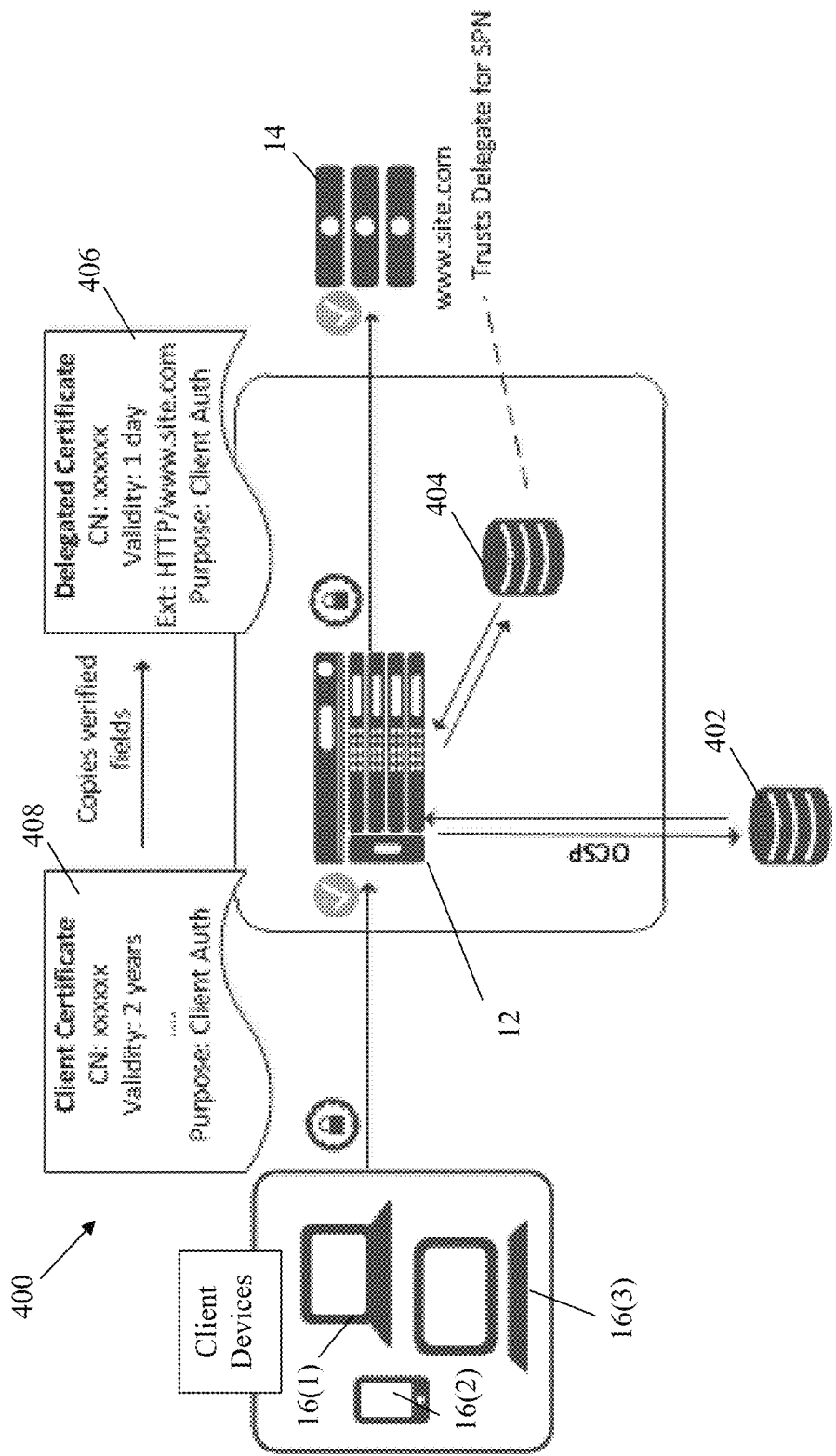
FIG. 4 is a block diagram of exemplary network environment with a network traffic management apparatus that facilitates client certificate delegation and a server device that is preconfigured to trust a local delegate certificate authority.

Referring more specifically to FIG. 4, a network environment 400 is shown that includes exemplary client devices 16(1), 16(2), and 16(3), the network traffic management apparatus 12, one of the server devices 14, a trusted issuer certificate authority 402 and a local delegate certificate authority 404. In this particular example, the delegate certificate 406 includes an extension of "http/www.site.com", which corresponds with the application for which one of the client devices 16(1), 16(2), or 16(3) requested access in step 300.

Additionally, the delegate certificate 406 is valid for, or has a limited lifetime of, such as one day by way of example only. The delegate certificate 406 further includes the data from the common name (CN) and purpose fields of the original or client certificate 408. In this particular example, the server device 14 is preconfigured to trust the local delegate certificate authority 404 that signs the delegate certificate 406.

Figure 5:
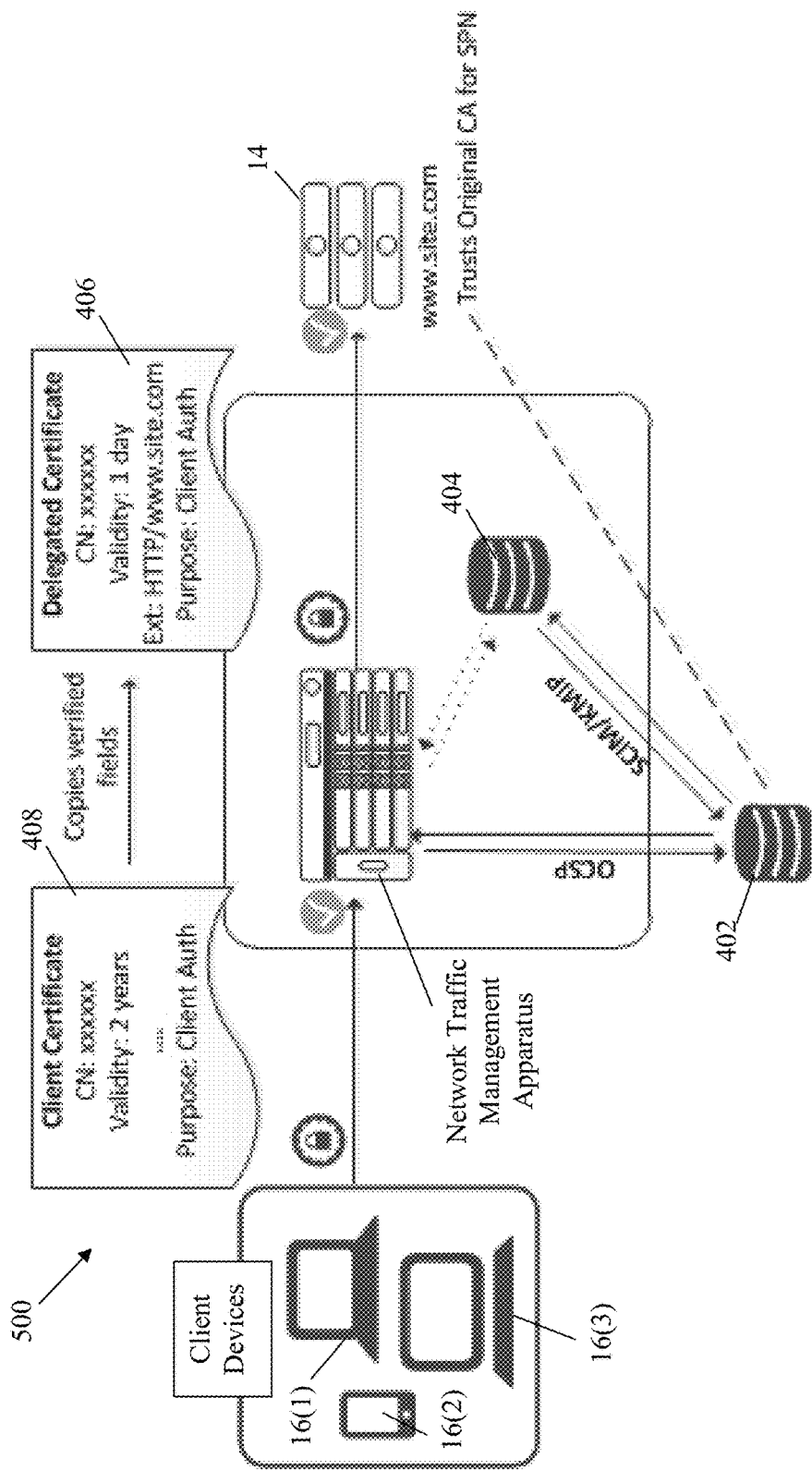
FIG. 5 is a block diagram of exemplary network environment with a network traffic management apparatus that facilitates client certificate delegation and a server device that is preconfigured to trust a trusted issuer certificate authority.

Referring more specifically to FIG. 5, another network environment 500 is shown that includes client devices 16(1), 16(2), and 16(3), the network traffic management apparatus 12, one of the server devices 14, the trusted issuer certificate authority 402, and a local delegate certificate authority 404. In this particular example, the server device 14 is preconfigured to trust the trusted issuer certificate authority 402 that is also trusted by the network traffic management apparatus 12, and that signed the original or client certificate 408.

Additionally, the local delegate certificate authority 404 has a trust relationship with the trusted issuer certificate authority 402 in this example. While the delegate certificate 406 is signed by the local delegate certificate authority 404, the server device 14 can validate the delegate certificate 406 based on the chain of authority for the local delegate certificate authority 404, which extends to the trusted issuer certificate authority 402 that the server device 14 is preconfigured to trust in this example.

In examples in which the delegate certificate 406 is annotated with an extension identifying the application for which one of the client devices 16(1), 16(2), or 16(3), requested access, the server device 14 can further validate the delegate certificate 406 based on the indication of the application. Optionally, in a constrained delegation example, the server device 14 can be preconfigured to trust only certificates that are annotated to include the indication of the application.

Referring back to FIG. 3, in step 308, the network traffic management apparatus 12 sends the delegate certificate to the one of the server devices 14(1)-14(n). In this example, the network traffic management apparatus 12 then receives an indication from the one of the server devices 14(1)-14(n) that the delegate certificate was successfully validated, although an error message or other message indicating a failure to validate the delegate certificate can also be received from the one of the server devices 14(1)-14(n) in other examples.

Additionally, the network traffic management apparatus 12 can send an indication to the one of the client devices 16(1)-16(n) that the original certificate was successfully validated, optionally upon receiving the acknowledgment from the one of the server devices 14(1)-14(n) that the delegate certificate was validated by the one of the server devices 14(1)-14(n). Accordingly, the network traffic management apparatus 12 in this example establishes a first SSL connection with the one of the client devices 16(1)-16(n) and a second SSL session with the one of the server devices 14(1)-14(n).

In step 310, the network traffic management apparatus 12 determines whether a client communication is received from the one of the client devices 16(1)-16(n) via the first SSL session. If the network traffic management apparatus 12 determines that a client communication is received from the one of the client devices 16(1)-16(n), then the Yes branch is taken to step 312.

In step 312, the network traffic management apparatus 12 decrypts the client communication and inspects or processes the payload of the client communication, optionally with the intelligent service(s) module 30 in this example, although other types and/or number of operations on the payload could be executed. Optionally, the communications between the network traffic management apparatus 12 and the one of the client devices 16(1)-16(n) via the first SSL session can be encrypted and decrypted based on Perfect Forward Secrecy (PFS) encryption, although other types of encryption can also be used.

In step 314, the network traffic management apparatus 12 re-encrypts the client communication and sends the encrypted client communication to the one of the server devices 14(1)-14(n) via the second SSL connection with the one of the server devices 14(1)-14(n). Optionally, the communications between the network traffic management apparatus 12 and the one of the server devices 14(1)-14(n) via the second SSL session can also be encrypted and decrypted based on PFS encryption, although other types of encryption can also be used.

Subsequent to sending the encrypted client communication to the one of the server devices 14(1)-14(n), or if the network traffic management apparatus 12 determines in step 310 that a client communication has not been received from the one of the client devices 16(1)-16(n), the network traffic management apparatus 12 proceeds to step 316. In step 316, the network traffic management apparatus 12 determines whether a server communication is received from the one of the server devices 14(1)-14(n) via the second SSL connection. If the network traffic management apparatus 12 determines that a server communication has been received, then the Yes branch is taken to step 318.

In step 318, the network traffic management apparatus 12 decrypts the server communication and optionally inspects or processes the payload data. In step 320, the network traffic management apparatus 12 re-encrypts the server communication and sends the encrypted server communication to the one of the client devices 16(1)-16(n) via the first SSL connection.

Referring back to step 316, if the network traffic management apparatus 12 determines that a server communication has not been received, then the No branch is taken back to step 310. Accordingly, the network traffic management apparatus 12 essentially waits for client or server communications to be received from the first or second SSL connections. Optionally, the network traffic management apparatus 12 can also determine whether the first or second SSL connection has been terminated, in which case the network traffic management apparatus can proceed back to step 300. Additionally, one or more of the steps illustrated in FIG. 3 can proceed in parallel for any number of the client devices 16(1)-16(n).

Figure 6:
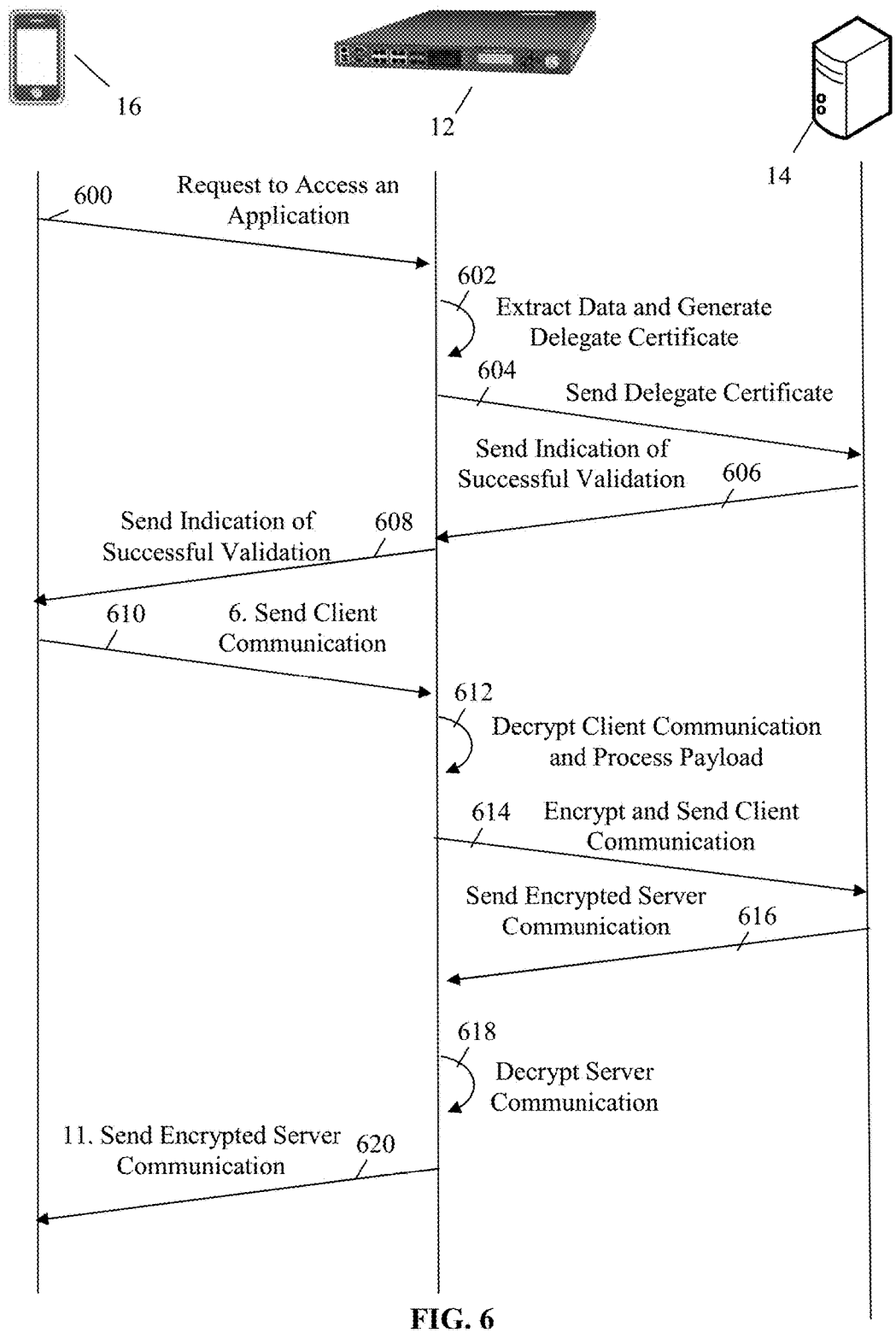
FIG. 6 is a timing diagram of exemplary method for facilitating client certificate delegation.

Referring more specifically to FIG. 6, a timing diagram of a method for utilizing a delegated version of a client certificate presented by a client device 16 for authentication to an application hosted by a server device 14 will now be described. In step 600 in this example, the client device 14 sends a request to access an application. Optionally, the request can include an original certificate or for example the network traffic management apparatus 12 can request the original certificate from the client device 16 in response to receiving the request to access the application.

In step 602, the network traffic management apparatus extracts data from field(s) of the original certificate and generates a delegate certificate that includes the extracted data. The delegate certificate is signed by a certificate authority that is trusted by the server device 14 hosting the application for which the client device 16 has requested access.

In step 604, the network traffic management apparatus sends the delegate certificate to the server device 14. The server device 14 validates the delegate certificate based on the preconfigured trust relationship with the certificate authority and, optionally, an indication of the application included in an extension of the delegate certificate. In step 606, the server device 14 sends an indication of successful validation of the delegate certificate to the network traffic management apparatus 12.

In step 608, the network traffic management apparatus 12 sends an indication of successful validation of the original certificate to the client device 16 and otherwise completes the process of establishing first and second SSL connections with the client device 16 and the server device 14, respectively. In step 610, the client device 16 sends a client communication to the network traffic management apparatus 12 via the first SSL connection established between the client device 16 and the network traffic management apparatus 12. In this example, the client communication is encrypted.

Accordingly, in step 612, the network traffic management apparatus 12 decrypts the client communication and inspects or processes the payload data included in the client communication as part of providing a security or other intelligent service within the network. In step 614, the network traffic management apparatus 12 re-encrypts the client communication and sends the client communication to the server device 14 via the second SSL connection between the network traffic management apparatus 12 and the server device 14.

In step 316, the server device 14 sends an encrypted server communication to the network traffic management apparatus 12 via the second SSL connection between the network traffic management apparatus 12 and the server device 14. In step 618, the network traffic management apparatus 12 decrypts the server communication and optionally inspects or processes any payload data associated with the server communication. In step 620, the network traffic management apparatus 12 re-encrypts the server communication and sends the server communication to the client device 16 via the first SSL connection between the network traffic management apparatus 12 and the client device 16.

Accordingly, with this technology, a delegated version of a presented original certificate is generated for authentication to an application, which allows network traffic management apparatuses to establish SSL connections with, and inspect payload data and insert services between, client and server devices. Advantageously, this technology allows network traffic management apparatuses to use PFS-capable ciphers on SSL connections with both client and server devices, which provides increased security of the associated communications.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for client certificate delegation implemented by a network traffic management system comprising one or more network traffic management apparatuses, server devices, or client devices, the method comprising:
   receiving a request from a client to access an application identified in the request and hosted by a server, the request including an identifying certificate;
   executing one or more instructions stored in non-transitory memory that results in one or more actions being performed involving the identifying certificate to generate a delegate certificate, the actions comprising:
      extracting data from one or more fields of the identifying certificate when the identifying certificate is valid,
      inserting at least a portion of the extracted data into the delegate certificate,
      annotating the delegate certificate to include an indication of the application hosted by the server and identified in the request received from the client, and
      signing the delegate certificate using a certificate authority that is trusted by the server hosting the application identified in the request; and
   sending the delegate certificate to the server along with the request received from the client.

2. The method of claim 1, further comprising:
   receiving an indication from the server that the delegate certificate was successfully validated by the server; and
   sending another indication to the client that the delegate certificate was successfully validated.

3. The method of claim 1, further comprising generating the delegate certificate to have an established lifetime.

4. The method of claim 1, wherein the annotating further comprises inserting the indication of the application into a Service Principle Name (SPN) extension of the delegate certificate.

5. The method of claim 1, further comprising:
   decrypting one or more communications encrypted using Perfect Forward Secrecy (PFS) encryption and received from the client; and
   encrypting another one or more communications to be sent to the server using PFS encryption.

6. The method of claim 1, wherein the certificate authority is a trusted issuer certificate authority that signed the identifying certificate or a local delegate certificate authority having a trust relationship with the trusted issuer certificate authority.

7. A network traffic management apparatus, comprising memory comprising programmed instructions stored thereon and one or more processors configured to be capable of executing the stored programmed instructions to:
   receive a request from a client to access an application identified in the request and hosted by a server, the request including an identifying certificate;
   perform one or more actions involving the identifying certificate to generate a delegate certificate, the actions comprising:
      extracting data from one or more fields of the identifying certificate when the identifying certificate is valid,
      inserting at least a portion of the extracted data into the delegate certificate,
      annotating the delegate certificate to include an indication of the application hosted by the server and identified in the request received from the client, and
      signing the delegate certificate using a certificate authority that is trusted by the server hosting the application identified in the request; and
   send the delegate certificate to the server along with the request received from the client.

8. The network traffic management apparatus of claim 7, wherein the one or more processors are further configured to be capable of executing the stored programmed instructions stored to:
   receive an indication from the server that the delegate certificate was successfully validated by the server; and
   send another indication to the client that the delegate certificate was successfully validated.

9. The network traffic management apparatus of claim 7, wherein the one or more processors are further configured to be capable of executing the stored programmed instructions stored to generate the delegate certificate to have an established lifetime.

10. The network traffic management apparatus of claim 7, wherein the one or more processors are further configured to be capable of executing the stored programmed instructions stored to insert the indication of the application into a Service Principle Name (SPN) extension of the delegate certificate.

11. The network traffic management apparatus of claim 7, wherein the one or more processors are further configured to be capable of executing the stored programmed instructions stored to:
   decrypt one or more communications encrypted using Perfect Forward Secrecy (PFS) encryption and received from the client; and
   encrypt another one or more communications to be sent to the server using PFS encryption.

12. The network traffic management apparatus of claim 7, wherein the certificate authority is a trusted issuer certificate authority that signed the identifying certificate or a local delegate certificate authority having a trust relationship with the trusted issuer certificate authority.

13. A non-transitory computer readable medium having stored thereon instructions for client certificate delegation comprising executable code which when executed by one or more processors, causes the processors to:
   receive a request from a client to access an application identified in the request and hosted by a server, the request including an identifying certificate;
   perform one or more actions involving the identifying certificate to generate a delegate certificate, the actions comprising:

extracting data from one or more fields of the identifying certificate when the identifying certificate is valid, insert at least a portion of the extracted data into the delegate certificate, annotate the delegate certificate to include an indication of the application hosted by the server and identified in the request received from the client, and sign the delegate certificate using a certificate authority that is trusted by the server hosting the application identified in the request; and send the delegate certificate to the server along with the request received from the client.

14. The non-transitory computer readable medium of claim 13, wherein the executable code when executed by the processors further causes the processor to:

receive an indication from the server that the delegate certificate was successfully validated by the server; and send another indication to the client that the delegate certificate was successfully validated.

15. The non-transitory computer readable medium of claim 13, wherein the executable code when executed by the processors further causes the processor to generate the delegate certificate to have an established lifetime.

16. The non-transitory computer readable medium of claim 13, wherein the executable code when executed by the processors further causes the processor to insert the indication of the application into a Service Principle Name (SPN) extension of the delegate certificate.

17. The non-transitory computer readable medium of claim 13, wherein the executable code when executed by the processors further causes the processor to:

decrypt one or more communications encrypted using Perfect Forward Secrecy (PFS) encryption and received from the client; and encrypt another one or more communications to be sent to the server using PFS encryption.

18. The non-transitory computer readable medium of claim 13, wherein the certificate authority is a trusted issuer certificate authority that signed the identifying certificate or a local delegate certificate authority having a trust relationship with the trusted issuer certificate authority.

19. A network traffic management system comprising one or more network traffic management apparatuses, server devices, or client devices, the network traffic management system comprising memory comprising programmed instructions stored thereon and one or more processors configured to be capable of executing the stored programmed instructions to:

receive a request from a client to access an application identified in the request, the request comprising an identifying certificate;

determine when the identifying certificate is valid and extracting data from one or more fields of the identifying certificate, when the determining indicates that the identifying certificate is valid;

generate a delegate certificate comprising the data and signed by a certificate authority trusted by a server hosting the application;

annotate, prior to communicating with the server, the delegate certificate to include the indication of the application identified in the access request received from the client; and send the delegate certificate to the server.

20. The network traffic management system of claim 19, wherein the one or more processors are further configured to be capable of executing the stored programmed instructions to:

receive an indication from the server that the delegate certificate was successfully validated by the server; and send another indication to the client that the delegate certificate was successfully validated.

21. The network traffic management system of claim 19, wherein the one or more processors are further configured to be capable of executing the stored programmed instructions to generate the delegate certificate to have an established lifetime.

22. The network traffic management system of claim 19, wherein the one or more processors are further configured to be capable of executing the stored programmed instructions to insert the indication of the application into a Service Principle Name (SPN) extension of the delegate certificate.

23. The network traffic management system of claim 19, wherein the one or more processors are further configured to be capable of executing the stored programmed instructions to:

decrypt one or more communications encrypted using Perfect Forward Secrecy (PFS) encryption and received from the client; and encrypt another one or more communications to be sent to the server using PFS encryption.

24. The network traffic management system of claim 19, wherein the certificate authority is a trusted issuer certificate authority that signed the identifying certificate or a local delegate certificate authority having a trust relationship with the trusted issuer certificate authority.

* * * * *